United States Patent [19]

Hattori et al.

[11] Patent Number: 4,937,489
[45] Date of Patent: Jun. 26, 1990

[54] ELECTROSTRICTIVE ACTUATORS

[75] Inventors: Shuzo Hattori, Nagakute; Naomasa Wakita; Makoto Okuda, both of Nagoya, all of Japan

[73] Assignee: NGK Spark Plug Co., Ltd., Japan

[21] Appl. No.: 242,612

[22] Filed: Sep. 9, 1988

[30] Foreign Application Priority Data

Sep. 16, 1987 [JP] Japan .................................. 62-231452

[51] Int. Cl.⁵ ............................................. H01L 41/08
[52] U.S. Cl. ..................................................... 310/328
[58] Field of Search ............................................ 310/328

[56] References Cited

U.S. PATENT DOCUMENTS

| | | | |
|---|---|---|---|
| 4,435,666 | 3/1984 | Fukui et al. | 310/328 |
| 4,570,095 | 2/1986 | Uchikawa | 310/328 |
| 4,633,118 | 12/1986 | Kosugi | 310/328 |
| 4,647,808 | 3/1987 | Shibuya | 310/328 |
| 4,703,215 | 10/1987 | Asano | 310/328 |
| 4,706,230 | 11/1987 | Inoue et al. | 310/328 X |
| 4,783,610 | 11/1988 | Asano | 310/388 |

*Primary Examiner*—Mark O. Budd
*Attorney, Agent, or Firm*—Larson and Taylor

[57] ABSTRACT

An electrostrictive actuator which comprises one or more electrostrictive elements and a rigid supporting member which may be formed of a metal plate for accommodating and supporting said electrostrictive elements, the supporting member being intended for amplification of an initial displacement of the electrostrictive elements caused by applying a voltage thereto. The actuator may be conveniently used for controlling fine angular adjustments of specimens and IC chips under microscopic scrutiny.

12 Claims, 3 Drawing Sheets

ELECTROSTRICTIVE ACTUATORS

FIELD OF THE INVENTION

The present invention relates to electrostrictive actuators which may be used for controlling fine angular adjustments of specimens and IC chips under microscopic scrutiny.

BACKGROUND OF THE INVENTION

It is a known phenomenon that an electrostrictive member made either of piezoelectric material which has an inverse piezoelectric effect upon polarization or of electrostrictive material which has a high dielectric constant and an electrostrictive effect without polarization gives rise to a strain when certain voltage is applied thereto. A displacement caused by such a strain is too small to find any practical applications.

In order to boost the displacement to some extent it has been proposed that a plurality of electrostrictive members are stacked in such a manner that all the members are connected electrically parallel to each other.

For example, U.S. Pat. No. 3,524,196 discloses a piezoelectric actuator which comprises a stack of piezoelectric elements arranged longitudinally of one another for acting cumulatively in series, alternate piezoelectric elements being piezoelectrically oppositely orientated and connected in opposite senses between two input terminals. In this U.S. Patent, there is provided levers for amplifying the movement produced by the piezoelectric elements, each lever is carried on a body structure by a flexure hinge.

U.S. Pat. No. 3,614,486 discloses an actuator employing the inverse piezoelectric and electrostrictive effects in which it comprises a stack of piezoelectric discs which is placed between end blocks of conductive material and is retained in a supporting block.

Similar stack arrangement of ceramic or piezoelectric plates for providing a mechanical movement in response to applied electrical potentials is disclosed in U.S. Pat. Nos. 3,154,700 and 4,423,347.

In the previously proposed electrostriction actuators, however, the stack arrangement of piezoelectric elements or members requires relatively complicated operations for preparation and the total number and the total height of the piezoelectric members to be stacked are subject to limitations because of poor physical strength of the arrangement. Therefore, the conventional actuators of the type mentioned above do not necessarily produce a satisfactory displacement.

It is therefore an object of the present invention to provide an electrostrictive actuator which is compact and simplified, and capable of providing relatively large displacement.

Another object of the present invention is to provide to an electrostrictive actuator in which an supporting member for one or more electrostrictive elements is formed as means for amplifying the displacement produced by the electrostrictive elements.

SUMMARY OF THE INVENTION

According to the present invention, there is provided an electrostrictive actuator comprising a stack of electrostrictive elements having movable ends to be displaced by applying voltage thereto and a rigid supporting member having a fitting groove for accommodating and supporting said stack, said supporting member being provided with slits arranged in accordance with a predetermined pattern to form a plurality of hinges and a plurality of levers intended for cooperating through said associated hinges, the displacement of the movable end of said stack being amplified by means of the cooperation of the respective levers, and the amplified displacement being delivered from any one of the levers.

Preferably, the supporting member may comprise a metal plate.

The above and other objects, features, and advantages of the invention will be apparent upon consideration of the following detailed description taken in connection with the accompanying drawings:

DETAILED DESCRIPTION

Figure 1:
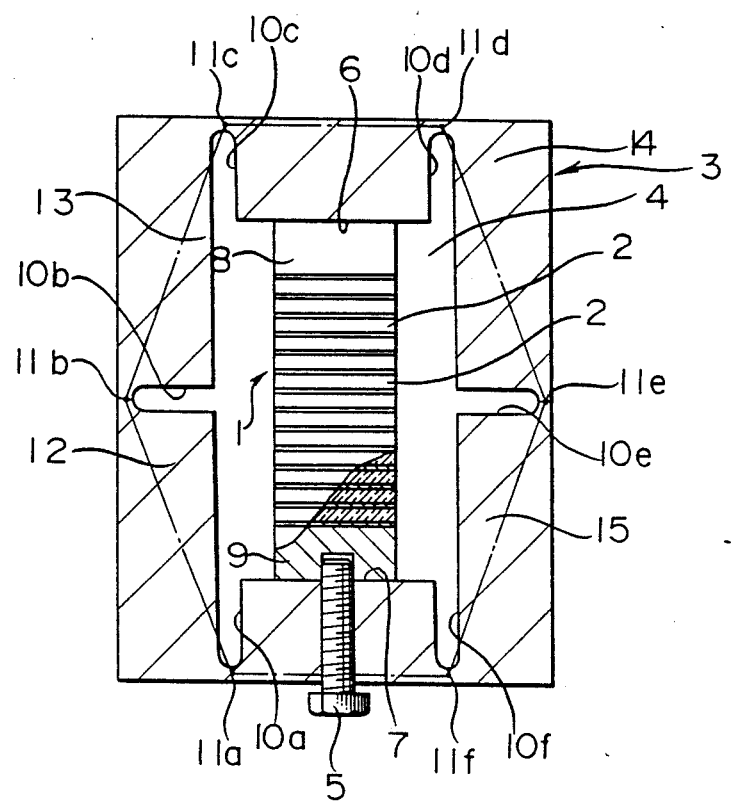
FIG. 1 is a schematic sectional view showing a first embodiment of the present invention.
Figure 2:
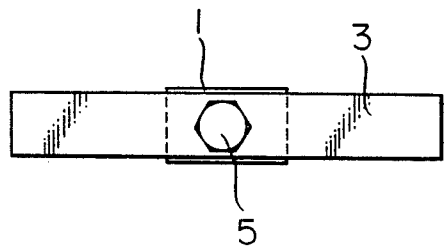
FIG. 2 is a bottom plan view of an actuator of FIG. 1.

Reference is now made to FIGS. 1 and 2 of the drawings wherein an embodiment of the present invention is illustrated.

In FIG. 1, reference numeral 1 designates a stack of electrostrictive elements 2 longitudinally disposed, each having a rectangular section. Reference numeral 3 a rigid metal plate which is provided with a fitting groove 4 for accommodating the stack 1 of the electrostrictive elements 2. The stack 1 is thus contained in the fitting groove 4 and is clamped by a tie bolt 5 between the opposite end walls 6 and 7 of the fitting groove 4. Between the respective end of the stack 1 and the respective end wall of the fitting groove 4 there are inserted movable end blocks 8 and 9, respectively which apply a uniform compressive force axially of the stack 1. The metal plate 3 is provided with a plurality of slits 10a, 10b, 10c, 10d, 10e and 10f which are arranged at the periphery of the fitting groove 4 so as to form a plurality of hinges 11a to 11f and a plurality of levers 12, 13, 14 and 15.

With the apparatus as described above, the stack 1 is electrically connected to a suitable voltage source (not shown). When the stack 1 is energized by applying a voltage from the voltage source thereto, it may be distorted so that the movable end blocks 8 and 9 are displaced longitudinally of the stack 1. In this connection it will be appreciated that such displacement has an inward or outward direction which depends upon whether the distortion caused in the stack 1 is an expansion or a contraction, that is the polarity of the applied voltage.

The displacements of the movable end blocks 8 and 9 of the electrostrictive stack 1 caused by application of the voltage thereto are transmitted to the end walls 6 and 7 and then a bending moment is produced about the respective hinge 11a to 11f. In response to the respective bending moment thus produced the respective lever is caused to pivot about the associated hinge. In this way, the displacement can be amplified by the hinges 11a to 11f. The amplified displacement may be then taken out from the levers 12 and 13 or 14 and 15.

Figure 3:
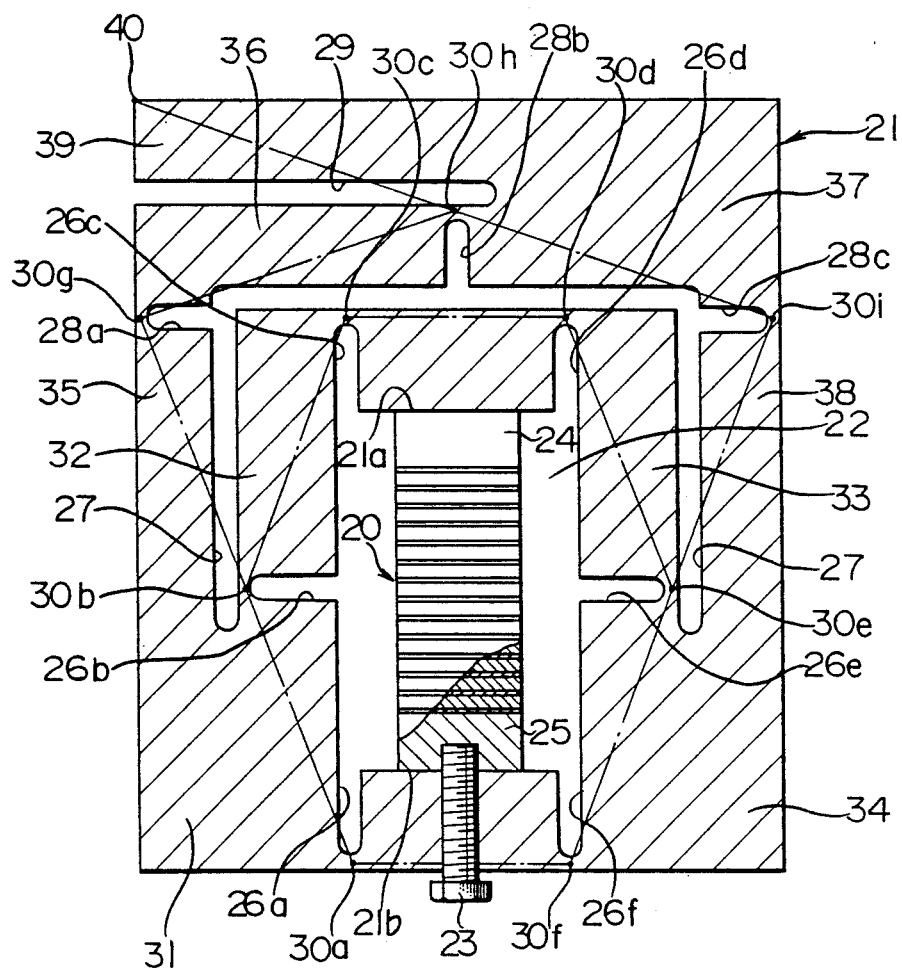
FIG. 3 is a schematic sectional view showing a second embodiment of the present invention.
Figure 4:
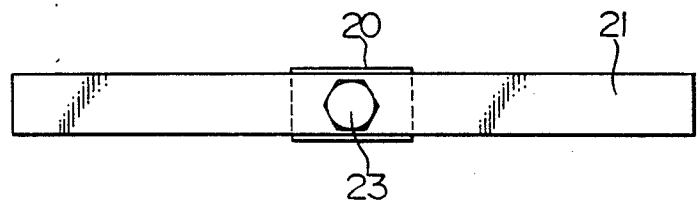
FIG. 4 is a bottom plan view of the embodiment of FIG. 3.

FIGS. 3 and 4 show a second embodiment of the present invention, in which the illustrated actuator comprises a stack 20 of electrostrictive elements and a rigid metal plate 21 intended for supporting the stack 20 and amplifying a displacement caused thereby. The rigid metal plate 21 is provided with a fitting groove 22 similar to that of the first embodiment, within which the stack 20 is clamped by a tie bolt 23 between opposite end walls 21a and 21b of the metal plate 21 through movable end blocks 24 and 25, slits 26a to 26f arranged at the periphery of the fitting groove 22, an U-shaped slit 27 which extends to surround the slits 26b to 26e, another slits 28a, 28b and 28c each of which is outwardly extended from the U-shaped slit 27, and a further slit 29 which is positioned at on the upper portion of the metal plate 21 and extends from one side end of the metal plate 21 toward the opposite side end thereof. By the provision of these slits, a plurality of hinges 30a to 30i and a plurality of levers 31 to 39 are demarcated. The levers 31 and 34 are integrally connected with the levers 35 and 38, respectively. The lever 39 serves as an output lever and is provided with an output terminal 40 for delivering an amplified displacement of the stack 20. This output lever 39 is integrally connected with the lever 37.

The sets of the hinges 30a, 30b and 30g and the hinges 30f, 30e and 30i are respectively positioned on straight lines and apart with identical distances from neighboring ones, while the hinges 30h, 30i and the output terminal 40 are positioned on a straight line and apart with an identical distance between neighboring ones.

Figure 5:
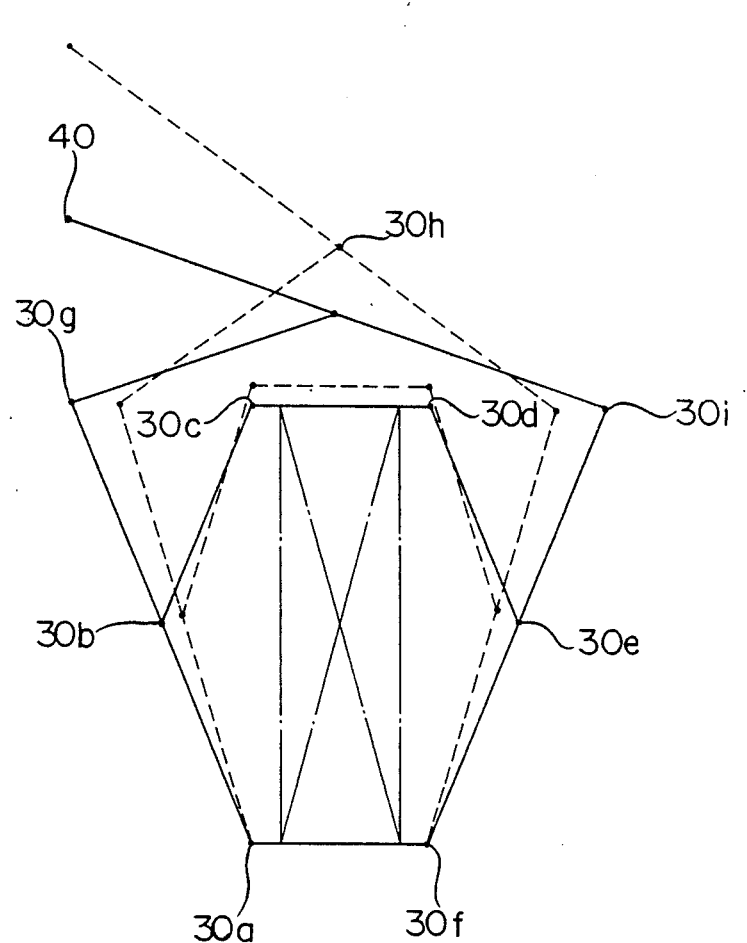
FIG. 5 is an operational diagram showing the operation of the arrangement of FIG. 3.

With the second embodiment illustrated in FIG. 3, when an electric voltage is applied to the stack 20 to generate a small magnitude of displacement at the movable end blocks 24 and 25 thereof, the generated displacement is transmitted through the hinges 30a, 30c, 30d and 30f to the levers 31, 32, 33 and 34 to be displaced, whose displacements in turn are amplified through the movements of the hinges 30b and 30e and further through the movements of the hinges 30g, 30h and 30i, resulting in amplified displacements of the levers 35, 36, 37 and 38. Therefore, the output terminal 40 of the output lever 39 has an amplified displacement which is 16 times as large as that of the stack 20 as illustrated by dotted lines in FIG. 5. By experiments conducted by the inventors it was shown that an amplified displacement of approximately 340 $\mu$m was obtained on the output terminal 40 of the output lever 39 for an initial piezoelectric longitudinal effect of 20 $\mu$m of the stack 20, this being corresponding to an amplification degree between 16 and 17 times.

With the embodiments mentioned above, although there has been described about the operation for the case of the stack of the electrostrictive elements is longitudinally expanded when the electric voltage is applied thereto, the same is true in the case of the stack contracts longitudinally by application of a voltage having opposite polarity.

The terms and expressions which have been employed herein are used as terms of description and not of limitation, and there is no intention, in the use of such terms and expressions, of excluding any equivalents of the features shown and described but it is recognized that various modifications are possible within the scope of the invention claimed.

What is claimed is:

1. An electrostrictive actuator comprising a stack of electrostrictive elements including movable ends to be displaced in response to the application of a voltage thereto and a rigid supporting member including means defining an opening therein in which said stack is supported, said supporting member further including slits therein forming hinges at the ends of said supporting member between which said stack is supported and further slits therein forming hinges in the sides of said supporting member intermediate said ends such that pairs of hinged levers are defined at the sides of the supporting member between said ends by the hinges at said ends and the hinges in the sides.

2. An electrostrictive actuator as claimed in claim 1 wherein said stack is supported by a central area at each of said ends, and wherein a pair of said slits is formed in each of said ends, one on each side of the respective support area at that end.

3. An electrostrictive actuator as claimed in claim 2 wherein said pairs of slits extend generally parallel to the longitudinal axis of said stack of electrostrictive elements.

4. An electrostrictive actuator as claimed in claim 3 wherein the slits in the sides of said supporting member extend generally perpendicular to the longitudinal axis of said stack of electrostrictive elements.

5. An electrostrictive actuator as claimed in claim 4 wherein said supporting member further includes a slot therein forming at least two additional hinges.

6. An electrostrictive actuator as claimed in claim 5 wherein said slot is in the shape of an inverted U and it includes laterally extending slit portions forming said additional hinges.

7. An electrostrictive actuator as claimed in claim 6 wherein said supporting member further comprises a further slit therein forming an output lever.

8. An electrostrictive actuator as claimed in claim 7 wherein said slot includes a further slit portion extending parallel to said stack and forming a hinge with said further slit.

9. An electrostrictive actuator as claimed in claim 1 wherein said supporting member comprises a further slit therein forming an output lever.

10. An electrostrictive actuator as claimed in claim 1 wherein said supporting member comprises a rigid metal plate.

11. An electrostrictive actuator comprising a stack of electrostrictive elements including movable ends to be displaced in response to the application of a voltage thereto and a rigid supporting member, said rigid supporting member including an opening therein in which said stack is supported between opposed ends of said supporting member, said supporting member further including pairs of slits at the opposed ends of said member between which said stack is supported forming pairs of hinges at said ends and at least one further slit in each of the sides of said supporting member intermediate said ends forming further hinges and defining, with said pairs of slits, two pairs of hinged levers which are capable of movement towards and away from said stack by virtue of said hinges.

12. An electrostrictive actuator as claimed in claim 11 wherein said supporting member comprises a rigid metal plate.

* * * * *